United States Patent
Kramer et al.

(10) Patent No.: US 8,787,758 B2
(45) Date of Patent: *Jul. 22, 2014

(54) SUPPORTING MULTI-DWELLING UNITS IN PASSIVE OPTICAL NETWORKS

(71) Applicant: Broadcom Corporation, Irvine, CA (US)

(72) Inventors: Glen Kramer, Petaluma, CA (US); Joshua L. Feinstein, Penngrove, CA (US); Ryan E. Hirth, Windsor, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,801

(22) Filed: Jul. 22, 2013

(65) Prior Publication Data

US 2014/0029936 A1 Jan. 30, 2014

Related U.S. Application Data (63) Continuation of application No. 12/574,920, filed on Oct. 7, 2009, now Pat. No. 8,494,364.

(60) Provisional application No. 61/107,258, filed on Oct. 21, 2008.

(51) Int. Cl.
*H04B 10/20* (2006.01)
*H04J 14/00* (2006.01)

(52) U.S. Cl.
USPC .................................. 398/58; 398/67; 398/71

(58) Field of Classification Search
USPC ............ 398/58, 66, 67, 70–72, 45, 46, 51, 57
See application file for complete search history.

(56) References Cited

U.S. PATENT DOCUMENTS 6,721,797 B1 * 4/2004 Kim .............................. 709/232
2006/0018322 A1 * 1/2006 Oron .......................... 370/395.1

* cited by examiner

*Primary Examiner* — Dalzid Singh
(74) *Attorney, Agent, or Firm* — Sterne, Kessler, Goldstein & Fox P.L.L.C.

(57) ABSTRACT

One embodiment provides a system for controlling flow rate in an EPON. The system includes an OLT, an ONUs coupled to the OLT via a passive optical splitter, a switch coupled to a port located on the ONU, and a flow-control mechanism. The ONU includes one or more queues corresponding to one or more classes of Services, and one or more ports. The switch includes a plurality of UNI ports, and the switch is configured to switch one or more upstream traffic flows belonging to the one or more classes of services from the plurality of UNI ports. The flow-control mechanism is configured to set a flow rate of an upstream traffic flow of certain class of service originated from a UNI port. The flow-control mechanism sets the flow rate based on status of an ONU queue corresponding to the class of service of the upstream traffic flow.

20 Claims, 8 Drawing Sheets

SUPPORTING MULTI-DWELLING UNITS IN PASSIVE OPTICAL NETWORKS

RELATED APPLICATION

This application claims the benefit of U.S. Provisional Application No. 61/107,258, entitled "Supporting Multi-Dwelling Units in Passive Optical Networks," by inventor Glen Kramer, filed 21 Oct. 2008.

BACKGROUND

1. Field

This disclosure is generally related to a passive optical network (PON). More specifically, this disclosure is related to a PON in a Multi-Dwelling Unit (MDU) environment.

2. Related Art

The large bandwidth of an optical fiber has enabled access-service providers to deliver triple-play (video, voice, and high-speed data) services to single family units (SFUs) over a passive optical network (PON). Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

Figure 1:
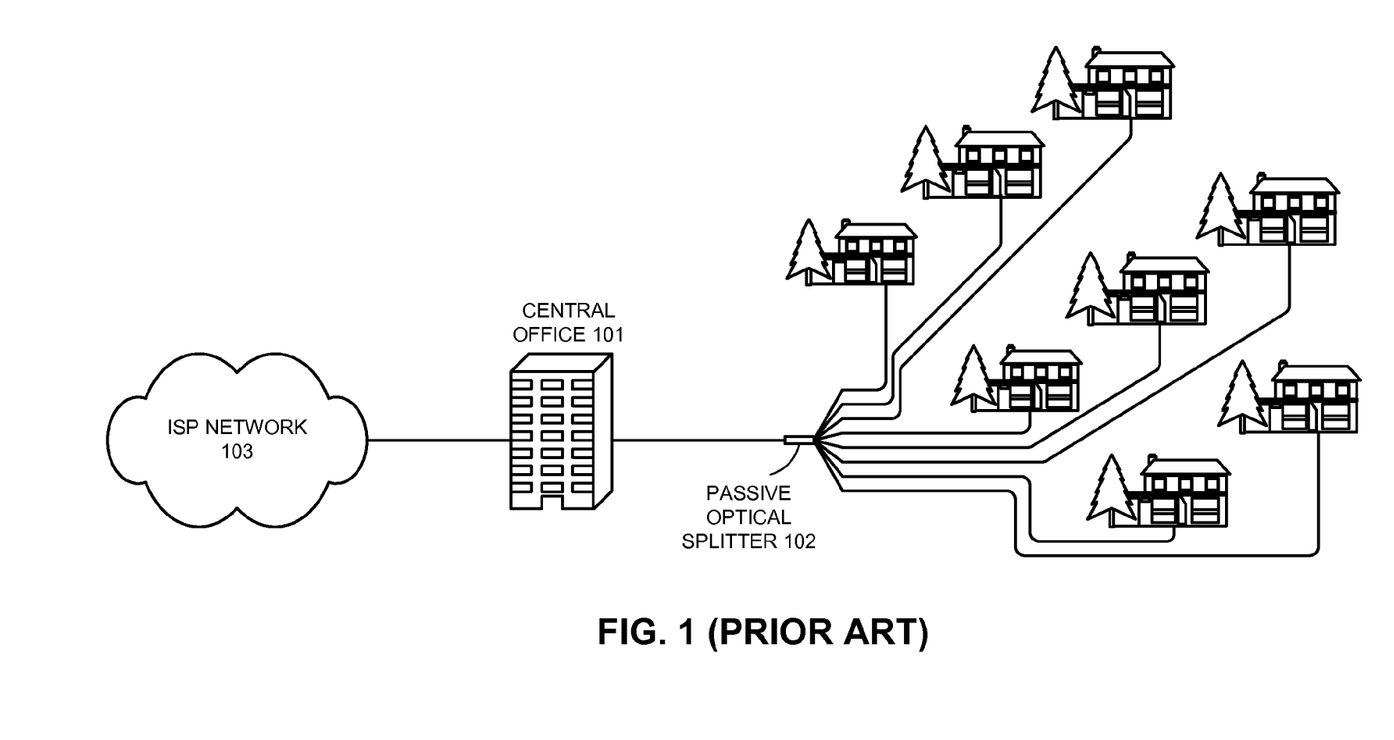
FIG. 1 presents a diagram illustrating a PON including a central office and a number of SFUs coupled through optical fibers and a passive optical splitter (prior art).

To deliver services to SFUs, the service provider installs an optical line terminal (OLT) in a central office and an ONU at each home. FIG. 1 presents a diagram illustrating a PON including a central office and a number of SFUs coupled through optical fibers and a passive optical splitter (prior art). A passive optical splitter 102 and optical fibers couple the SFUs to a central office 101. Passive optical splitter 102 can reside near end-user locations to minimize the initial fiber deployment costs. Central office 101 can couple to an external network 106, such as a metropolitan area network operated by an Internet service provider (ISP). Although FIG. 1 illustrates a tree topology, a PON can also be based on other topologies, such as a logical ring or a logical bus. Note that, although in this disclosure many examples are based on Ethernet PONs (EPONs), embodiments of the present invention are not limited to EPONs and can be applied to a variety of PONs, such as ATM PONs (APONs), gigabit PONs (GPONs, which are PONs using a variant of a generic framing protocol), and wavelength division multiplexing (WDM) PONs.

The SFU approach becomes difficult in a Multi-Dwelling Unit (MDU) environment. An MDU can be an apartment building, condominium, hotel, or other buildings that are subdivided into multiple residences. MDU presents challenging requirements to access service providers, such as maintenance of secure and stable communications among all subscribers, service isolation to prevent inter-service congestion, and provisioning and enforcement of service level agreements for sensitive traffic such as cellular backhaul (often found on rooftops). Additionally, it is often impractical to replace the building communication infrastructure. Hence, current MDU solutions often utilize existing copper wiring within the building for delivering high bandwidth triple-play services to individual customers. Within a PON, such an MDU approach relies on an ONU that is capable of supporting multiple subscribers (users). An MDU-enabled ONU can provide interfaces for the fiber connection to the OLT located at the central office along with multiple copper wire connections to individual residences.

SUMMARY

One embodiment provides a system for controlling flow rate in an Ethernet Passive Optic Network (EPON). The system includes an optical line terminal (OLT), an optical network units (ONUs) coupled to the OLT via a passive optical splitter, a switch coupled to a port located on the ONU, and a flow-control mechanism. The ONU includes one or more queues corresponding to one or more classes of Services, and one or more ports. The switch includes a plurality of user-to-network interface (UNI) ports, and the switch is configured to switch one or more upstream traffic flows belonging to the one or more classes of services from the plurality of UNI ports. The flow-control mechanism is configured to set a flow rate of an upstream traffic flow of certain class of service originated from a UNI port. The flow-control mechanism sets the flow rate based on status of an ONU queue corresponding to the class of service of the upstream traffic flow.

In a variation on the embodiment, the flow-control mechanism is located in the OLT, and the flow-control mechanism is configured to set the flow rate based on queue status of all ONUs coupled to the OLT.

In a variation on the embodiment, the flow-control mechanism implements a traffic-flow backpressure mechanism.

In a further variation, the flow-control mechanism is configured to send a flow-control message associated with the ONU queue to a traffic shaper or policer coupled to a corresponding egress queue in the switch.

In a variation on the embodiment, the flow-control mechanism is located in the ONU.

In a further variation, the flow-control mechanism is configured to predict future status of the ONU queue based on a GATE message received from the OLT.

In a further variation, the flow-control mechanism is configured to determine whether a difference between a time that the ONU queue corresponding to the upstream traffic flow overflows and a current time is greater than a predetermined amount, and in response to the difference not being greater than the predetermined amount, issue a PAUSE message for the upstream traffic flow to the switch.

In a variation on this embodiment, the system includes a traffic shaping mechanism configured to enforce a service contract across one or more ports located on the ONU.

In a further variation, the traffic shaping mechanism includes one or more shaping elements, and a shaping element is configured to manage one or more queues associated with the one or more ports located on the ONU.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Because each MDU-enable ONU manages multiple users, several features become important. An ONU should allow the providers to monitor, police, and shape the bandwidth of each user depending on the subscribed service. Due to the unique network topology of PONs and its high data rates, it is essential for a service provider to ensure a scalable and efficient end-to-end Quality of Service (QoS) for its users/subscribers. Typical QoS metrics include minimum bandwidth ($B_{min}$) that indicates guaranteed bandwidth (BW) required by a service, maximum bandwidth ($B_{max}$) that indicates s allowed BW for a service when surplus BW is available, maximum frame loss ratio ($L_{max}$), and maximum frame delay ($D_{max}$). Different types of services often require different QoS parameters. For example, voice services often require less bandwidth and lower delay than video services.

However, provisioning QoS to individual subscribers/users, who may subscribe to different services, can be difficult for an ONU because the upstream (in the direction from an ONU to an OLT) bandwidth available to the ONU varies dynamically based on both the ONU's request and status of all other ONUs coupled to the same OLT. Note that in the upstream direction, the ONUs need to share channel capacity and resources, because there is only one link coupling the passive optical coupler to the OLT, as shown in FIG. 1. Embodiments of the present invention provide a system that can support QoS to multiple users coupled to an ONU in an EPON. The system monitors queue status of one or more queues located on the ONU corresponding to one or more classes of services (CoS). Based on the status of a queue corresponding to a CoS, the system controls the flow rate of an upstream traffic flow belonging to the CoS. In some embodiments, the system implements per-queue flow control by applying backpressure on a per-queue basis to a switch coupled to a port on the ONU. In some embodiments, the system predicts future ONU queue status based on a received GATE message.

MDU PON

Figure 2:
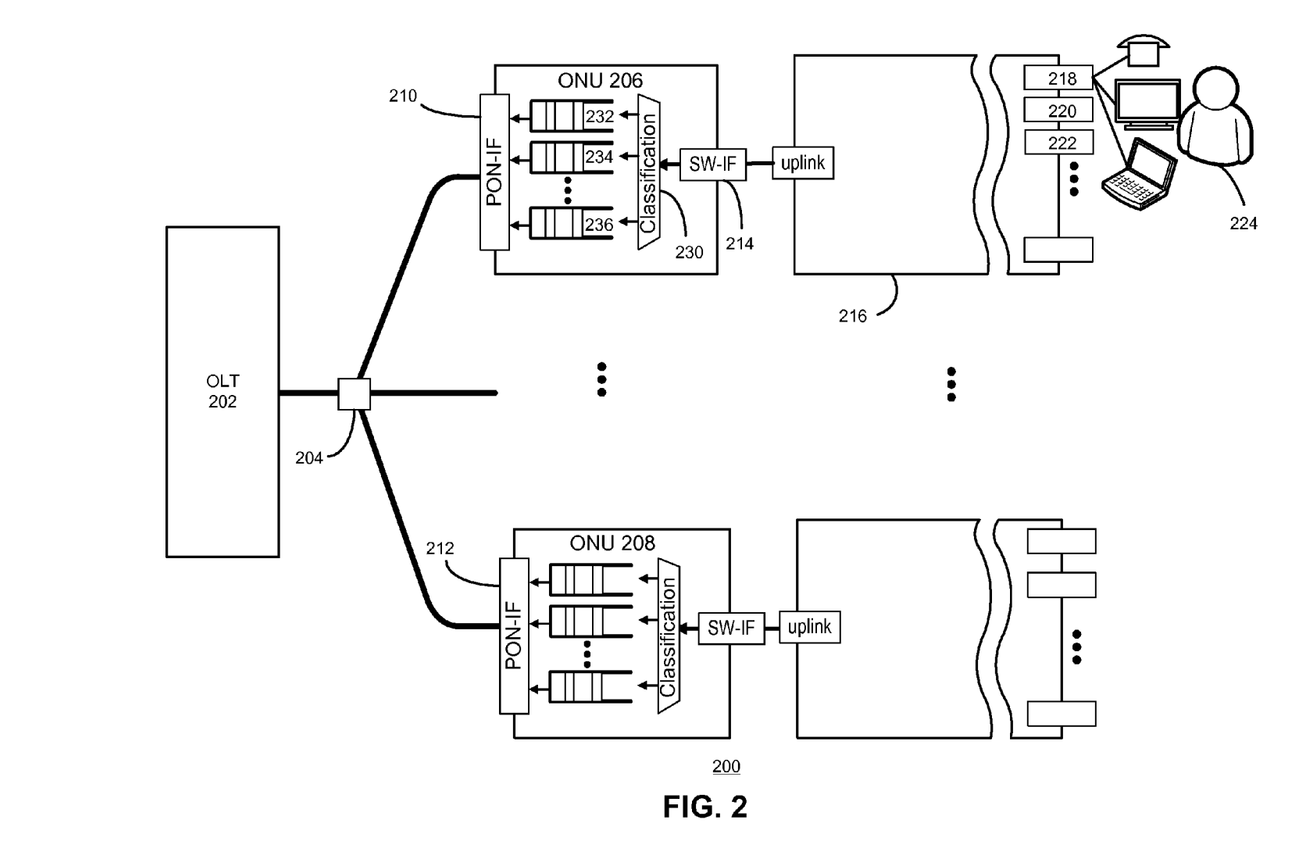
FIG. 2 presents a diagram illustrating an exemplary upstream architecture of an MDU EPON in accordance with an embodiment of the present invention.

FIG. 2 presents a diagram illustrating an exemplary upstream architecture of an MDU EPON in accordance with an embodiment of the present invention. An MDU EPON 200 includes an OLT 202, a passive optical splitter 204, and a number of ONUs including ONUs 206 and 208. Each ONU includes a PON interface, such as PON interfaces 210 and 212, for coupling to OLT 202 and a switch interface, such as switch interface 214, for coupling to a small-and-medium-sized-business (SMB) switch, such as SMB switch 216. Each SMB switch comprises a number of user-to-network interface (UNI) ports for providing different types of services to individual subscribers. For example, port 218 can provide voice, video, and high-speed data services to a user 224.

Each ONU also includes a classification mechanism, such as classification mechanism 230, configured to classify the incoming packets into different classes of service, and to place them into corresponding queues, such as queue 232-236. Note that IEEE standard 802.1D distinguishes the following traffic classes: network control, voice, video, controlled load, excellent effort, best effort, and background. Other classification criteria are also possible. In one embodiment, each ONU queue serves one CoS. In a further embodiment, multiple traffic classes are grouped together to occupy the same queue.

Figure 3:
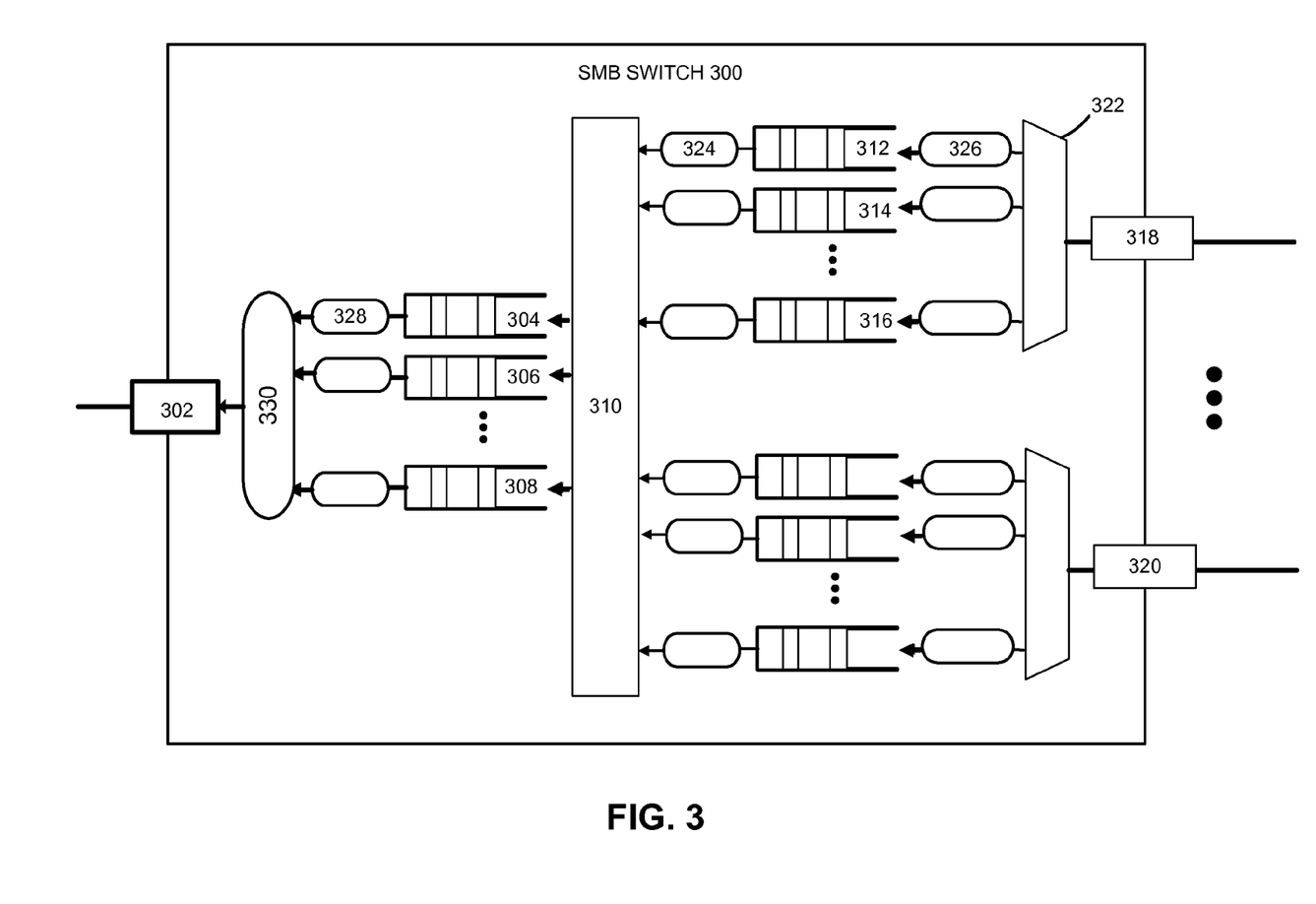
FIG. 3 presents a diagram illustrating an exemplary upstream architecture of a small-and-medium-sized business (SMB) switch.

FIG. 3 presents a diagram illustrating an exemplary upstream architecture of an SMB switch. An SMB switch 300 includes an uplink port 302, a number of output/egress queues including queues 304-308, a cross-connect 310, a number of input/ingress queues, including queues 312-316, and a number of UNI ports including ports 318 and 320.

Upstream traffic received from each UNI port of the switch is classified and placed in a corresponding input/ingress queue by a classification mechanism, such as classification mechanism 322, based on the CoS of the traffic. In one embodiment, each UNI port has its own set of input/ingress queues, and each queue serves one CoS. To support QoS, each input/ingress queue is coupled to a traffic shaper and/or a policer, which can be controlled by an ONU. For example, input/ingress queue 312 is coupled to a traffic shaper 324 and a policer 326. Policer 326 enforces QoS policy to upstream traffic that fills input/ingress queue 312 by dropping packets once the bandwidth of the traffic exceeds the maximum bandwidth allowed for the CoS. For example, if queue 312 is dedicated to voice service, whose $B_{max}$ is 1 Mbps, policer 326 starts dropping incoming packets once traffic directed to queue 312 consumes a bandwidth greater than 1 Mbps. Similarly, shaper 324 enforces QoS by reducing the output rate of input/ingress queue 312 if the bandwidth exceeds the maximum bandwidth allowed for the CoS.

Cross-connect 310 inter-connects the multiple sets of input/ingress queues and the set of output/egress queues. Similarly, each output/egress queue can be dedicated to a CoS, and each output/egress queue is also coupled to a traffic shaper for QoS implementation. For example, queue 304 is coupled to a traffic shaper 328. In addition, a scheduler 330 is coupled to the set of output/egress queues and is responsible for upstream traffic scheduling.

In the example shown in FIG. 3, SMB switch 300 includes 24 UNI ports, and each port is configured to support up to 100 Mb/s upstream traffic resulting in total maximum upstream traffic of 2.4 Gb/s. In addition, the minimum bandwidth, or the guaranteed upstream bandwidth of SMB switch 300 may vary depending on the traffic mix. For example, the $B_{min}$ for premium data is 10 Mb/s. Hence, if only data traffic is present on all 24 UNI ports, the guaranteed BW for SMB switch 300 is 240 Mb/s. On the other hand, the minimum bandwidth for SMB switch 300 can be as high as 600 Mb/s if voice, video, and data traffic are all present. Note that the $B_{min}$ for voice and video are 1 Mb/s and 14 Mb/s, respectively.

The ONU coupled to SMB switch 300 may support upstream traffic up to 1 Gb/s, 2.5 Gb/s, or 10 Gb/s depending on the configuration of the ONU. In other words, the uplink capacity of SMB switch 300 can be 1 Gb/s, 2.5 Gb/s, or 10 Gb/s depending on the configuration of the ONU coupled to the switch. However, because all ONUs coupled to an OLT share a common upstream trunk link, at a given time, an ONU may or may not be able to use the entire uplink capacity. If the EPON is lightly loaded, that is if only a few ONUs request upstream transmission, an ONU may be able to transmit all packets arriving from an SMB switch at the full uplink capacity. However, if all ONUs coupled to an OLT are requesting upstream transmission, each ONU can only be allocated with a limited amount of upstream bandwidth. Hence, the ONU's throughput decreases, which may result in overflow of ONU queues. Such queue overflow can force the ONU to drop incoming packets.

To avoid packet loss and to enforce QoS, it is important for the ONU to control or to throttle the upstream traffic flow from the coupled SMB switch. A conventional way to enforce flow control in Ethernet is to allow the ONU to send a PAUSE frame/packet to the switch to stop uplink transmission from the switch. However, this PAUSE-based is inefficient for QoS purposes because one full ONU queue can result in halting of all types of upstream traffics. Moreover, the PAUSE scheme can also be unfair to users requesting lower bandwidth, such as a user requesting voice service only.

ONU Backpressure

Figure 4:
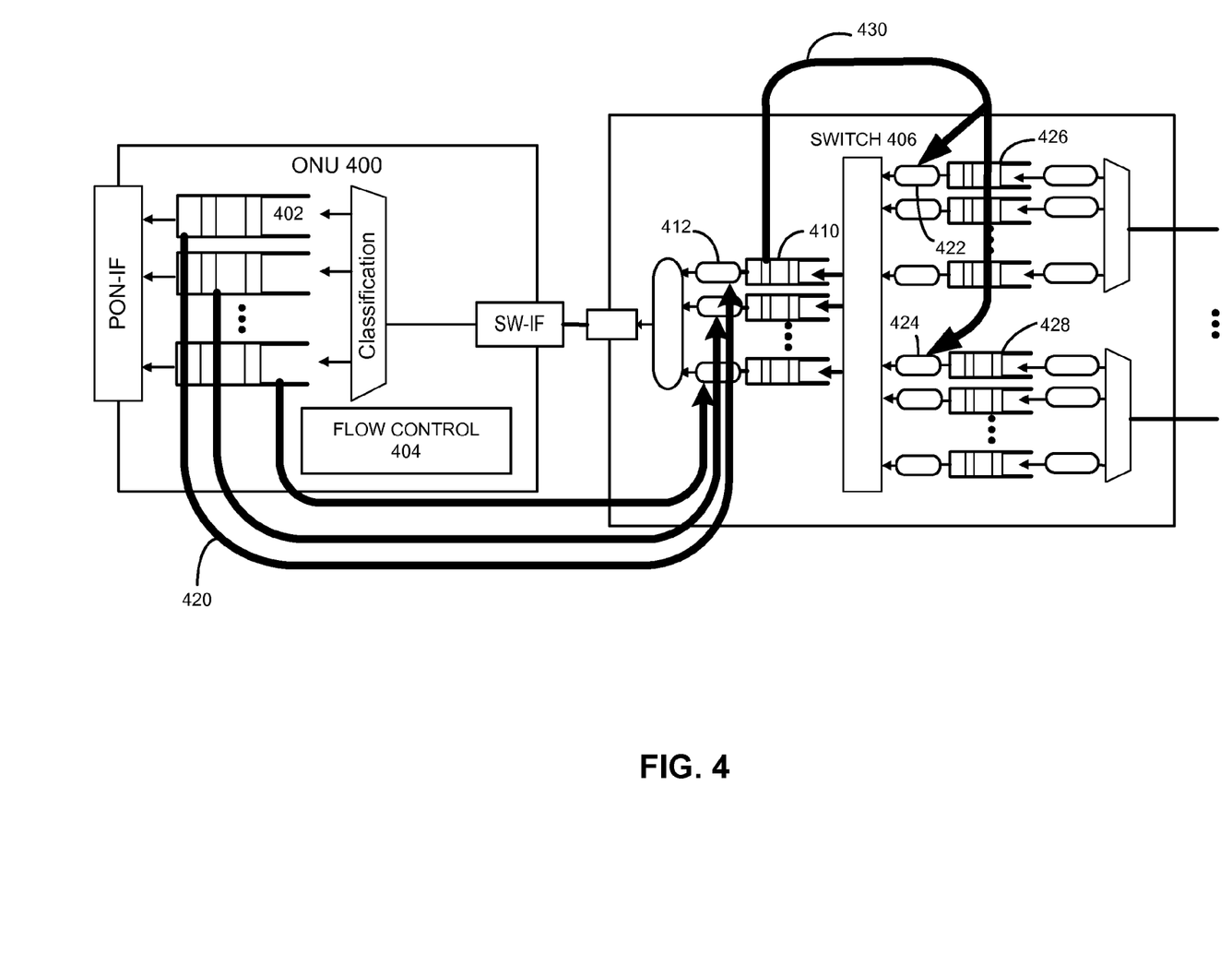
FIG. 4 presents a diagram illustrating an ONU backpressure mechanism in accordance with an embodiment of the present invention.

FIG. 4 presents a diagram illustrating an ONU backpressure mechanism in accordance with an embodiment of the present invention. In FIG. 4, in addition to a number of queues, such as queue 402, ONU 400 also includes a flow-control mechanism 404. In one embodiment, flow-control mechanism 404 implements backpressure algorithm for controlling uplink flow rate from switch 406. The backpressure from ONU queues to switch output/egress queues are shown by arrows, such as arrow 420 in FIG. 4. Flow-control mechanism 404 monitors the status of every queue on ONU 400 as packets arrive to those queues, and sends flow-control messages to the traffic shapers of corresponding output/egress queues on switch 406 based on the monitored queue status. For example, ONU queue 402 is dedicated to voice traffic, which corresponds to an output/egress queue 410 also dedicated to voice traffic on switch 406. When ONU queue 402 exceeds a predetermined upper threshold, flow-control mechanism 404 sends a message to a traffic shaper 412 coupled to output/egress queue 410, instructing traffic shaper 412 to reduce the flow rate from queue 410. In one embodiment, the message is a "PAUSE" message which instructs traffic shaper 412 to pause traffic flow from queue 410, either for a fixed amount of time, or until further notice. On the other hand, when ONU queue 402 is below a predetermined lower threshold, flow-control mechanism 404 sends a message to traffic shaper 412, instructing traffic shaper 412 to increase the flow rate from queue 410. Because each queue is dedicated to a CoS, this per-queue-based flow-control scheme can adjust the flow rate of one CoS based on queue status for that CoS without affecting traffic flows of other CoS, thus providing a fair and efficient way of enforcing QoS.

Furthermore, the backpressure can be extended from the output/egress queues of switch 406 to the input/ingress queues of switch 406. For example, once traffic shaper 412 limits the flow rate for traffic from output/egress queue 410, queue 410 may start to fill up. Once queue 410 exceeds an upper threshold, a "reduce-flow-rate" message or a control signal can be sent to traffic shapers, such as shapers 422 and 424, of corresponding input/egress queues (input/ingress queues that are assigned to the same CoS), such as input/ingress queues 426 and 428. Note that arrow 430 in FIG. 4 indicates the extended backpressure from switch output/egress queues to input/ingress queues.

In one embodiment, the flow-control mechanism is located on the OLT, and the flow-control messages are first sent from the OLT to the ONU, and then to the SMB switch. Because the OLT is aware of queue status of all coupled ONUs (based on the REPORT messages sent by the ONUs) in an EPON, the OLT can predict the total load on the EPON and adjust flow rates from individual queues accordingly.

ONU "Look Ahead"

In one embodiment of the present invention, the ONU generates flow-control instructions not only based on its current queue status, but also based on its knowledge of imminent decrease in queue occupancy. In other words, the ONU is able to "look ahead" when issuing flow-control instructions.

Figure 5:
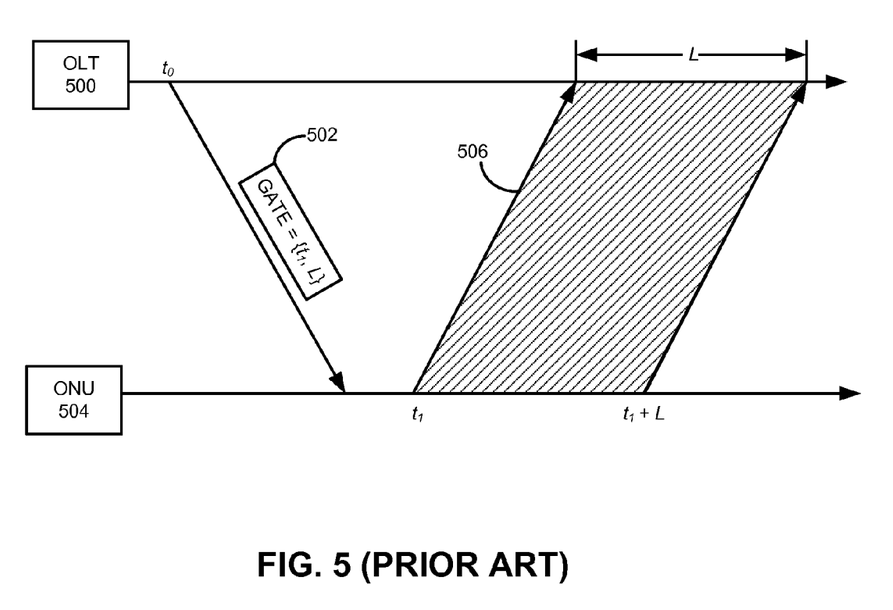
FIG. 5 presents a time-space diagram illustrating the process of an ONU upstream transmission after receiving a GATE message (prior art)

As explained earlier, all ONUs in an EPON share the upstream link. In order to avoid collision of upstream transmissions from different ONUs, ONU transmissions are arbitrated. This arbitration can be achieved by allocating a transmission window (grant) to each ONU. An ONU defers transmission until its grant arrives. A multipoint control protocol (MPCP) located in the OLT MAC control layer can be used to assign transmission time slots to ONUs. MPCP relies on GATE (a message from the OLT to the ONU to assign grant) and REPORT (a message from the ONU to the OLT reporting its queue status). The MPCP GATE message includes information regarding the start time and the length of the assigned transmission slot for an ONU. FIG. 5 presents a time-space diagram illustrating the process of an ONU's upstream transmission after receiving a GATE message (prior art). At time $t_0$, OLT 500 transmit a GATE message 502 to ONU 504 indicating the start time ($t_1$) and length (L) of a timeslot for ONU 504 to transmit upstream. When time $t_1$ arrives, ONU 504 starts upstream transmission 506, which ends at time $t_1+L$. Note that the GATE message arrives at some time before the intended start time of the transmission slot. Therefore, from the received GATE message, the ONU is able to anticipate upcoming dequeuing of a particular ONU queue, and issue flow instructions (send flow-control messages) associated with that queue accordingly.

Figure 6A:
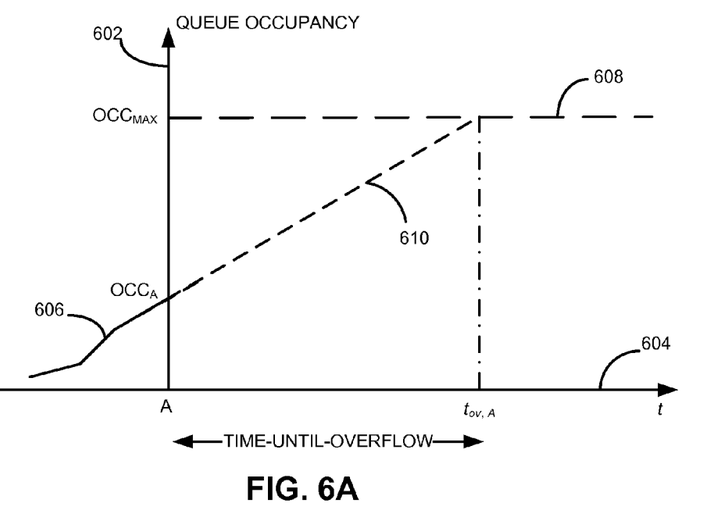
FIG. 6A presents a diagram illustrating queue occupancy as a function of time in the absence of a pending GATE message in accordance with an embodiment of the present invention.

FIG. 6A presents a diagram illustrating queue occupancy as a function of time in the absence of a pending GATE message in accordance with an embodiment of the present invention. FIG. 6A includes vertical axis 602 representing queue occupancy and horizontal axis 604 representing time. Solid line 606 illustrates the queue occupancy as a function of time until the current time as marked by time point A. Note that the different slopes of the different segments of solid line 606 reflect that the ingress data rate varies before time A, and the slope for each segment is determined by the ingress data rate at that moment. At the current time (time A), the queue occupancy is marked as $OCC_A$. In addition, FIG. 6A includes a dashed line 608 indicating the upper limit of the queue occupancy ($OCC_{MAX}$). The queue overflows when its occupancy reaches $OCC_{MAX}$. FIG. 6A also includes a dashed line 610 indicating the projected queue occupancy after the current time if no GATE message is received and that the queue continues to be filled with incoming traffic at the current rate. Note that the slope of dashed line 610 reflects a near-instantaneous ingress data rate at time A. Line 610 intercepts line 608 at time $t_{ov,A}$, which indicates the projected queue-overflow time as of time A. The difference between $t_{ov,A}$ and A is defined as time-until-overflow.

Figure 6B:
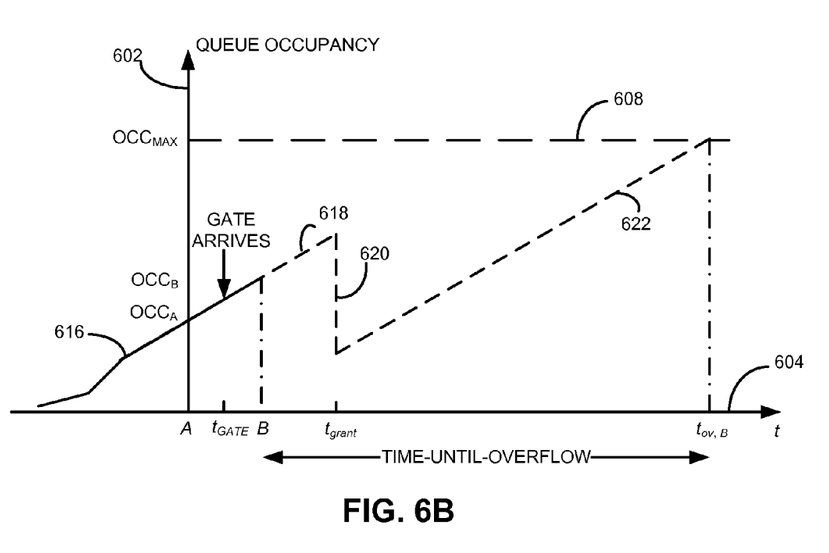
FIG. 6B presents a diagram illustrating queue occupancy as a function of time in the presence of a pending GATE message in accordance with an embodiment of the present invention.

FIG. 6B presents a diagram illustrating queue occupancy as a function of time in the presence of a pending GATE message in accordance with an embodiment of the present invention. Similar to FIG. 6A, FIG. 6B includes vertical axis 602, horizontal axis 604, and a dashed line 608 indicating $OCC_{MAX}$. Solid line 616 indicates that the queue continues to be filled at the rate of the incoming traffic from time A to a new current time (time B). A GATE message, which includes the start time and size of an upcoming transmission (a grant) from the queue, arrives at a time between A and B ($t_{GATE}$). Dashed line 618 indicates that the queue is expected to be filled at the same rate until the start time of the grant ($t_{grant}$), at which the queue occupancy is reduced due to the upstream transmission from the queue. Dashed line 620 indicates that the queue occupancy is reduced by the size of the grant at the grant start time. After the transmission, the queue is expected to be filled again at the rate of the incoming traffic, as shown by dashed line 622. Line 622 intercepts with line 608 at time $t_{ov,B}$, which indicates the projected queue-overflow time as of time B. Note that in FIG. 6B, because the upcoming upstream transmission as indicated by the GATE message is taken into account, the projected queue-overflow time ($t_{ov,B}$) is later than the one shown in FIG. 6A ($t_{ov,A}$).

Based on the projected queue-overflow time, the ONU logic can issue flow-control instructions to a corresponding queue. In one embodiment, the ONU logic can issue a PAUSE message to a corresponding queue to pause incoming traffic flow. In a further embodiment, the PAUSE message expires after a certain amount of time to allow the queue to resume its transmission. In addition, the ONU can also issue a CANCEL message to allow the queue to resume its transmission. In one embodiment, the ONU issues a CANCEL message to a corresponding queue if the time-until-overflow is grater than an issue-cancel-threshold, which is defined as the minimum value the time-until-overflow can take before a CANCEL message is permitted to be sent, and if the PASUE expires.

Figure 7:
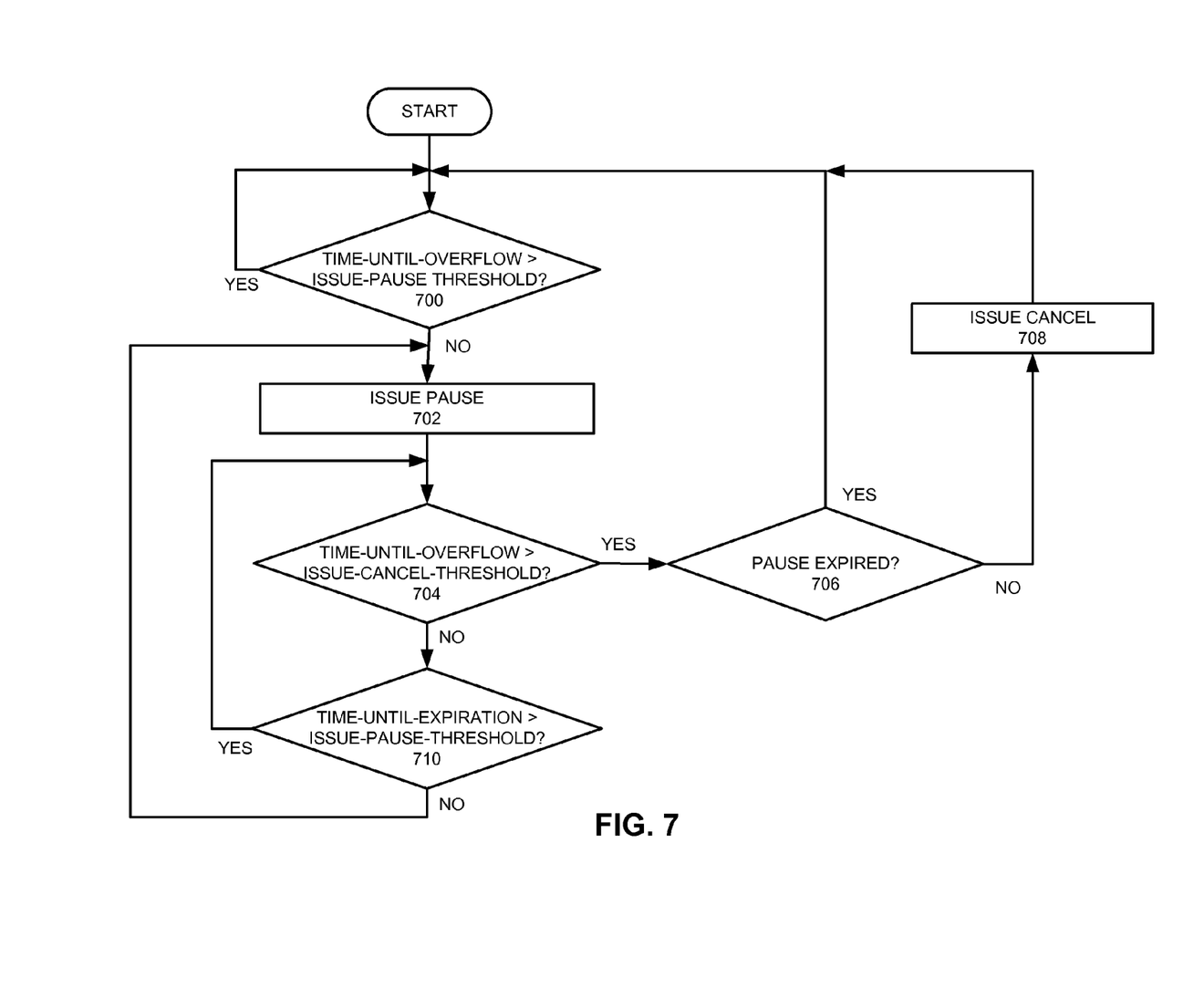
FIG. 7 presents a flow chart illustrating an exemplary flow-control process that issues PAUSE and CANCEL messages in accordance with an embodiment of the present invention.

FIG. 7 presents a flow chart illustrating an exemplary flow-control process that issues PAUSE and CANCEL messages in accordance with an embodiment of the present invention. During operation, the system determines whether the time-until-overflow is greater than an issue-pause-threshold, which is defined as the minimum value time-until-overflow is permitted to reach without issuing a PAUSE message (operation 700). The time-until-overflow can be calculated based on the current time, the incoming traffic rate, and any pending GATE messages. In one embodiment, the system also takes into consideration a flow-pause-latency, which is defined as the time delay between the issuance of the PAUSE message corresponding to a queue and the cessation of traffic, and makes sure that the value of the issue-pause-threshold exceeds that of the flow-pause-latency.

If the time-until-overflow is not greater than the issue-pause-threshold, a PAUSE message is issued (operation 702). Subsequently, the system determines whether the time-until-overflow is greater than the issue-cancel-threshold (operation 704). If so, the system further determines whether the PAUSE has expired (operation 706). If so, the system returns to operation 700; otherwise, the system issues a CANCEL message (operation 708). If the time-until-overflow time is not greater than the issue-cancel-threshold, the system determines whether a time-until-expiration, which is defined as the time until the most recently issued PAUSE message expires, is greater than the issue-pause-threshold (operation 710). If so, the system returns to operation 704, if not, the system issues a pause (operation 702).

Multi-Port Traffic Shaping

In some embodiments, an ONU is able to enforce service contracts across one or more user-to-network interface (UNI) ports. Such an approach allows traffic of a single customer to span multiple UNI ports and additionally gives service provider the ability to offer service contracts exceeding the maximum rate of a single UNI port. For example, one UNI port can support 1 Gb/s traffic. By assigning a customer two such UNI ports, the service provider can offer a 2 Gb/s service contract to a customer.

Figure 8:
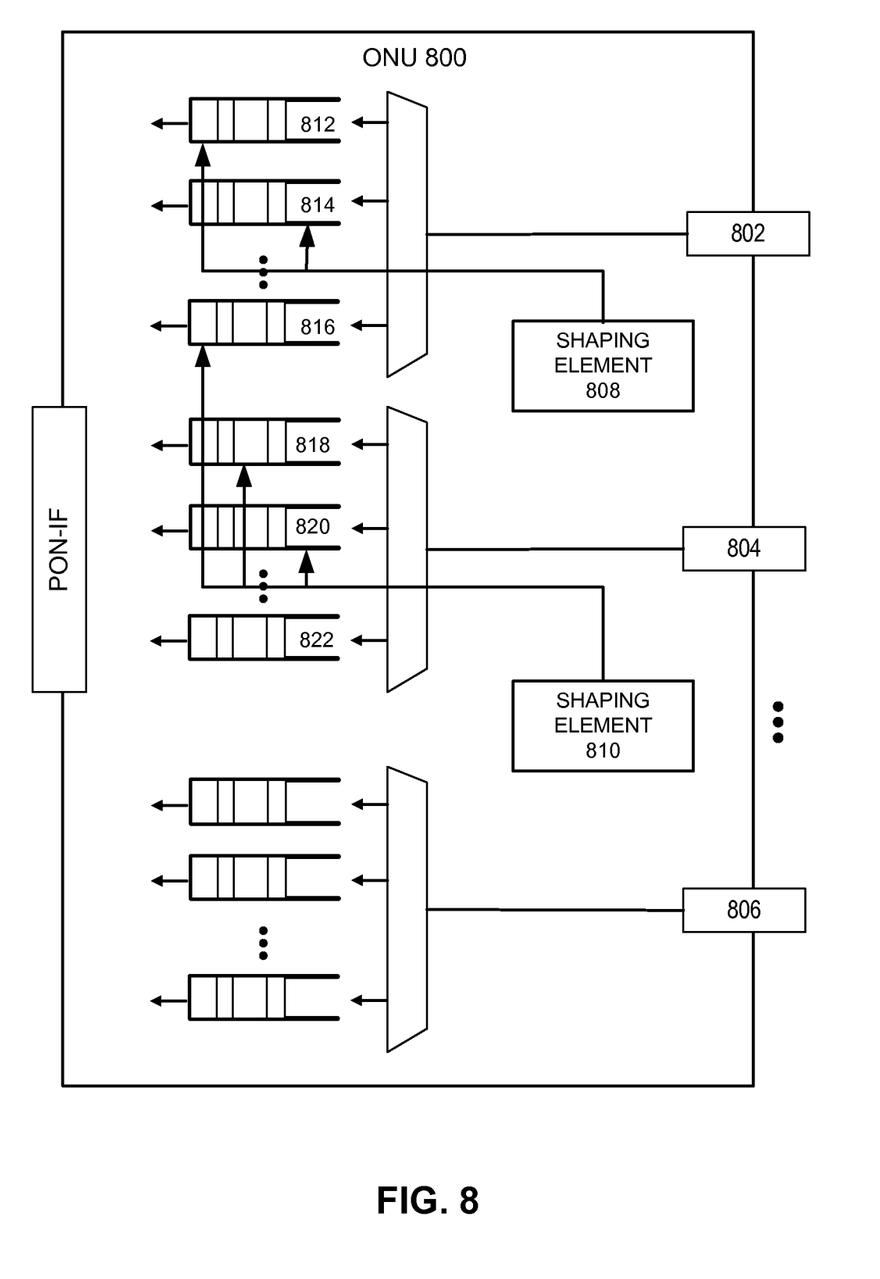
FIG. 8 presents an exemplary architecture of an ONU in accordance with an embodiment of the present invention.

FIG. 8 presents an exemplary architecture of an ONU in accordance with an embodiment of the present invention. ONU 800 includes a number of UNI ports, such as port 802-806, and a number of traffic-shaping elements, such as elements 808 and 810. Each UNI port is coupled to a number of queues. For example, port 802 is coupled to queues 812-816, and port 804 is coupled to queues 818-822.

Each traffic-shaping element can enforce service contract by supporting a configurable steady-state data rate and configurable maximum burst size. In addition, each traffic-shaping element can be configured to manage any combination of a number of queues within a number of UNIs. For example, traffic-shaping element 808 is configured to manage queues 812 and 814 within UNI port 802, and traffic-shaping element 810 is configured to manage queues 816, 818, and 820, which belong to port 802 and 804. By configuring traffic-shaping elements to manage a set of queues across different UNIs, shaping to any rate up to the sum of the line rate of the UNIs can be supported.

In some embodiments, traffic-shaping elements use a credit-based system to shape traffic. During operation, each traffic-shaping element accrues shaping credits at a rate based on the configured data rate, and these credits saturate at a value based on the configured maximum burst size. When packets are transmitted from a certain queue in a certain channel, the one or more shaping elements configured to be affected by the queue-channel pair will decrease their shaping credits appropriately. For example, when queue 812 transmits, shaping element 808 can decrease shaping credits associated with queue 812, accordingly.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for controlling flow rate in an Ethernet Passive Optical Network (EPON), comprising:
    an optical network unit (ONU) comprising an ONU queue corresponding to a particular class of service;
    a switch configured to store each of a plurality of upstream packets received from a plurality of user-to-network interface (UNI) ports in one of a plurality of output switch queues based on a class of service of the upstream packet; and
    a flow-control mechanism configured to control a flow rate of upstream packets with the particular class of service from one of the plurality of output switch queues to the ONU queue based on a status of the ONU queue.

2. The system of claim 1, wherein the flow-control mechanism is located in an optical line terminal (OLT) coupled to the ONU.

3. The system of claim 1, wherein the flow-control mechanism is located in the ONU.

4. The system of claim 1, wherein the status of the ONU queue is determined based on whether a number of upstream packets stored in the ONU queue exceeds a threshold amount.

5. The system of claim 1, wherein the flow-control mechanism is configured to send a flow-control message to a traffic shaper coupled to the one of the plurality of output switch queues to control the flow rate.

6. The system of claim 5, wherein the flow-control message is a pause message that instructs the traffic shaper to pause a flow of upstream packets with the particular class of service from the one of the plurality of output switch queues to the ONU queue.

7. The system of claim 1, wherein the flow-control mechanism is configured to predict the status of the ONU queue in the future based on a GATE message received from an optical line terminal (OLT) coupled to the ONU.

8. The system of claim 7, wherein the flow-control mechanism is configured to:
    determine whether a difference between a time that the ONU queue is predicted to overflow and a current time is greater than a predetermined amount; and
    in response to the difference not being greater than the predetermined amount, issue a pause message to the one of the plurality of output switch queues.

9. An optical network unit (ONU) for controlling flow rate in an Ethernet Passive Optical Network (EPON), comprising:
    an ONU queue corresponding to a particular class of service;
    a port coupled to a switch configured to store each of a plurality of upstream packets in one of a plurality of output switch queues based on a class of service of the upstream packet; and
    a flow-control mechanism configured o control a flow rate of upstream packets with the particular class of service from one of the plurality of output switch queues to the ONU queue based on a status of the ONU queue,
    wherein the flow-control mechanism is configured to send a flow-control message to a traffic shaper coupled to the one of the plurality of output switch queues to control the flow rate.

10. The ONU of claim 9, wherein the status of the ONU queue is determined based on whether a number of upstream packets stored in the ONU queue exceeds a threshold amount.

11. The ONU of claim 9, wherein the flow-control message is a pause message that instructs the traffic shaper to pause a flow of upstream packets with the particular class of service from the one of the plurality of output switch queues to the ONU queue.

12. The ONU of claim 9, wherein the flow-control mechanism is configured to predict the status of the ONU queue in the future based on a GATE message received from an optical line terminal (OLT) coupled to the ONU.

13. The ONU of claim 12, wherein the flow-control mechanism is configured to:
    determine whether a difference between a time that the ONU queue is predicted to overflow and a current time is greater than a predetermined amount; and
    in response to the difference not being greater than the predetermined amount, issue a pause message to the one of the plurality of output switch queues.

14. The ONU of claim 9, wherein the status of the ONU queue is a predicted status.

15. A method for controlling flow rate in an Ethernet Passive Optical Network (EPON), comprising:
    storing each of a plurality of upstream packets received from a plurality of user-to-network interface (UNI) ports in one of a plurality of output switch queues based on a class of service of the upstream packet; and
    monitoring a status of an ONU queue corresponding to a particular class of service;
    controlling a flow rate of upstream packets with the particular class of service from one of the plurality of output switch queues to the ONU queue based on the status; and
    sending a flow-control message to a traffic shaper coupled to the one of the plurality of output switch queues to control the flow rate.

16. The method of claim 15, wherein the status of the ONU queue is determined based on whether a number of upstream packets stored in the ONU queue exceeds a threshold amount.

17. The method of claim 15, wherein the flow-control message is a pause message that instructs the traffic shaper to pause a flow of upstream packets with the particular class of service from the one of the plurality of output switch queues to the ONU queue.

18. The method of claim 15, further comprising:
    predicting the status of the ONU queue in the future based on a GATE message received from an optical line terminal (OLT) coupled to the ONU.

19. The method of claim 18, further comprising:
    determining whether a difference between a time that the ONU queue is predicted to overflow and a current time is greater than a predetermined amount; and
    in response to the difference not being greater than the predetermined amount, issuing a pause message to the one of the plurality of output switch queues.

20. The method of claim 15, wherein the status of the ONU queue is a predicted status.

* * * * *

UNITED STATES PATENT AND TRADEMARK OFFICE
CERTIFICATE OF CORRECTION

| | |
|---|---|
| PATENT NO. | : 8,787,758 B2 |
| APPLICATION NO. | : 13/947801 |
| DATED | : July 22, 2014 |
| INVENTOR(S) | : Kramer et al. |

It is certified that error appears in the above-identified patent and that said Letters Patent is hereby corrected as shown below:

In the Claims

Column 10, line 1, please replace "configured o control" with --configured to control--.

Signed and Sealed this
Seventh Day of October, 2014

Michelle K. Lee
*Deputy Director of the United States Patent and Trademark Office*